April 30, 1929.    L. A. MAPEL    1,711,236
METHOD AND APPARATUS FOR INDICATING THE HEAD
OF A LIQUID BODY OR THE FLOW THEREFROM
Filed June 9, 1921
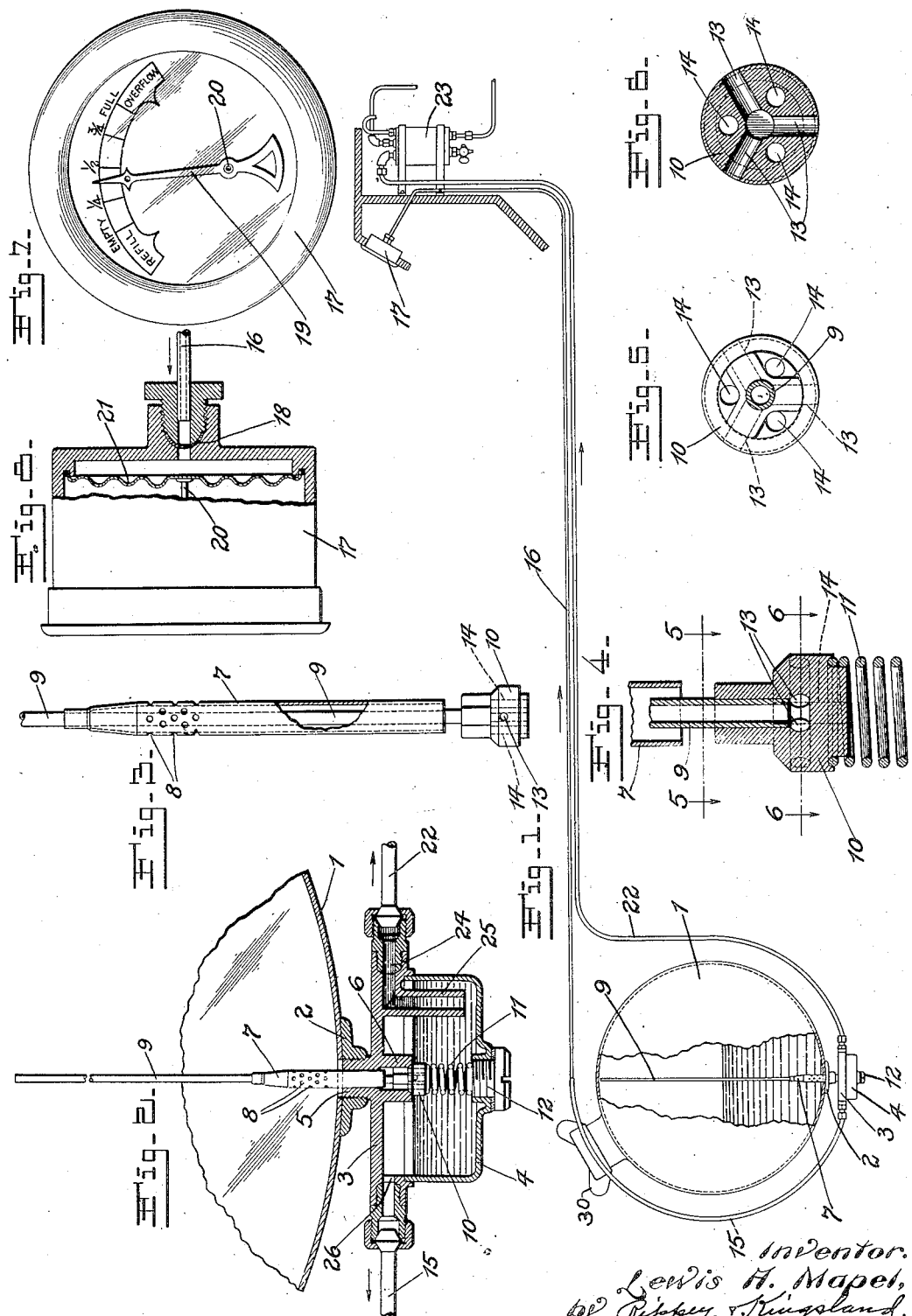

Patented Apr. 30, 1929.

1,711,236

UNITED STATES PATENT OFFICE.

LEWIS A. MAPEL, OF ST. LOUIS, MISSOURI, ASSIGNOR, BY MESNE ASSIGNMENTS, TO STROMBERG MOTOR DEVICES COMPANY, OF CHICAGO, ILLINOIS, A CORPORATION OF ILLINOIS.

METHOD AND APPARATUS FOR INDICATING THE HEAD OF A LIQUID BODY OR THE FLOW THEREFROM.

Application filed June 9, 1921. Serial No. 476,333.

This invention relates to indicating instruments and systems, and more particularly to a method and an apparatus for indicating the head of a liquid body or the flow therefrom.

An object of the invention is to provide an improved and highly efficient instrument operative to afford accurate visual indication of the amount of liquid contained in a liquid supply tank or receptacle as, for instance, a liquid fuel tank of an automobile or other use to which the invention may be applied.

The present invention relates to that type of indicating instruments in which the indicating device is affected through the medium of a confined column of air which is subjected to a head of the liquid in the tank or receptacle so that any variation in the level of the liquid will be accurately indicated by the indicating device.

In this type of instrument it has heretofore been extremely difficult and in many cases impossible to maintain the instrument in an operative condition. Among other difficulties it has been found difficult, and in some cases impossible, to maintain the confined column of air in the proper condition, due to the tendency of certain liquids to dissolve the air and thus establish a differential as between the confined column of air and the head of liquid.

Another object of the invention is to provide an instrument of the character mentioned which completely overcomes the difficulties heretofore encountered and which automatically, and as an incident to its use, maintains the instrument constantly in a proper operative condition and wholly eliminates the differential as between the condition of the confined air and the liquid head.

Where an instrument is employed to indicate at a distance the status of a liquid body, for instance the head or depth or the flow therefrom, conditions are encountered which effect the accuracy and reliability of the indication. Thus errors may creep in, not only on account of absorption of the volume of confined air but also on account of the condition of the air. Where the confined air becomes impregnated with the liquid vapor, the variations of vapor pressure may not only disturb the indication, but this vapor is also liable to condense in the lead to the responsive devices. Such a lead is of necessity of comparatively small cross-section, so as to be in effect a capillary tube. Accordingly the condensed vapor acts to clog up the lead, with the result that the true air pressure of the confined air volume is not indicated; this error is a material one due to the fact that even the maximum air pressure is comparatively small. The condensation of the vapors is not only rendered possible on account of the exposure of the lead, but often the collection of the same is in fact facilitated due to the dips and bends which such a lead has, especially in automobiles where the lead must frequently pass under, over or around obstructions. Then again the instrument is often in disuse for a long period, as when an automobile is stored. These conditions cannot be cured or corrected by adding more air to the confined air volume, for that acts only as a pallative and not as a true corrective.

Another object of this invention is, therefore, to provide means whereby atmospheric conditions are established in the confined volume of air at intervals, by periodically exposing the volume to the atmosphere and by periodically expelling the laden air; such exposure being moreover automatic so as not to require the attention of the operator or driver.

Another object of this invention is to provide means whereby the flow of the liquid will be indicated in order that a failure of such flow will be indicated.

Another object of this invention is to provide means, whereby, in a fuel feeding system for an automobile one or more of the following conditions will be indicated; a leak in the fuel line or its connections, a stop in the fuel line or its connections, improper operation of the fuel pump (such as the vacuum feed), closure of the atmospheric vent in the fuel tank, overflow of the fuel tank, and the like.

Another object of the invention is to provide an instrument of the character mentioned which may be easily assembled and applied to use, and the parts of which are few in number and of simple and durable construction.

Various other objects and numerous advantages will be apparent from the following description, reference being made to the accompanying drawing, which illustrates an embodiment of this invention as applied to a fuel supply for an automobile, employing a vacuum tank, and in which—

Fig. 1 is a view diagrammatic in nature showing one embodiment of the invention applied to an automobile.

Fig. 2 is an enlarged view showing the fitting, constituting an important feature of the invention, in section.

Fig. 3 is an enlarged view of a portion of the fitting detached from the remaining parts.

Fig. 4 is an enlarged vertical sectional view of the lower portion of the part shown in Fig. 3.

Fig. 5 is a sectional view on the line 5—5 of Fig. 4.

Fig. 6 is a sectional view on the line 6—6 of Fig. 4.

Fig. 7 is a view showing the face of the indicating device.

Fig. 8 is a side elevation with the parts in section showing the connection for the confined column of air, and the means for dampening the movements of the indicator.

As shown, the gasoline tank 1, having the usual filling opening cap 30, provided with the usual atmospheric vent, has a hole through the bottom thereof bordered by a flange 2, the central threaded hole of which communicates with the hole through the tank wall. A fitting member is supported by the flange 2, the same comprising an upper portion 3 and a lower portion 4 supported thereby and forming a chamber. The upper portion 3 of the fitting has an exteriorly threaded hollow stud 5 screwed into the threaded hole in the flange 2. The upper portion 3 of the fitting also has a hollow portion 6 extending downwardly into the fitting or air pressure chamber, the opening through which forms an enlarged continuation of the opening through the stud 5.

A sleeve 7 has its lower end extending into the opening through the stud 5. Said sleeve 7 extends upwardly within the tank 1 and is provided with a number of filter holes 8 admitting gasoline into the sleeve from the tank.

A tube 9, extending through the sleeve 7, has its upper open end at a point adjacent to the top wall of the tank and its lower end attached to a plug 10. A spring 11 has its upper end engaging the lower end of the plug 10 and its lower end engaging a removable plug 12 closing a drain outlet in the lower wall of the pressure chamber. The sleeve 7 is reduced at its upper end so as to make a permanent connection with the tube 9, while the lower end of the sleeve is open. The tube 9 furthermore seats in and is permanently connected with the plug 10. Accordingly the sleeve, tube and plug form an assembled unit.

The lower end of the tube 9 within the plug 10 communicates with a number of holes 13 formed in the plug. The holes 13 open into the pressure chamber below the lower end of the portion 6 against which the plug is pressed by the spring 11 to form a seal. The tube 9 and the holes 13 admit air to the pressure chamber from the top of the tank 1 under the circumstances and during the times hereinafter explained. A number of holes 14 through the plug 10 allow liquid to pass into the fitting chamber from the tank 1, the liquid first having passed through the filter holes 8 and the lower portion of the sleeve 7. The number and area of the filter holes 8 is ample to allow for the stoppage of a goodly portion thereof, those remaining open providing sufficient area to allow gasoline to flow from the tank into the pressure member.

The pressure chamber is constructed so that the liquid therein is normally at about the level shown in Fig. 2. This forms a confined air space in the upper portion of the pressure chamber and communicates pressure to the indicating responsive device through a confined column of air. As shown, the confined column of air is within an appropriately arranged pipe or tube leading from the pressure chamber to the indicating device. The pipe or tube which forms a lead preferably comprises a relatively large part 15 in direct connection with the pressure chamber above the level of the liquid therein, and a relatively small part 16 leading from the large part 15 to the indicating device. The tube 15 is of such diameter that it is impossible for a liquid piston to be retained therein when the lower end thereof is exposed to the atmosphere. The part 16 of the tube admits pressure into the case of the indicating device 17 through a dampener 18. The pointer 19 of the indicating device is supported on a spindle 20 controlled by a diaphragm 21. The graduated scale of the indicating device with which the pointer 19 cooperates may be arranged as shown (Fig. 7) in which one end of the scale contains the word "Refill" divided from the adjoining space by a line indicated by the word "Empty", with designations "¼", "½" and "¾" disposed at proper spaces beyond which is the word "Full" located at the proper demarcation, followed by the word "Overflow".

The significance of the designation "Refill" is that during operation of the vacuum fuel system, liquid fuel is taken over from the pressure chamber. At the time the liquid fuel is taken over by the vacuum fuel system, the amount of liquid in the pressure chamber is materially reduced, allowing the liquid in the tube 9 to run out into the pressure chamber. This establishes atmospheric pressure in the pressure chamber. Establishment of atmospheric pressure in said chamber allows the diaphragm to assume its normal position. Assumption of such normal position by the diaphragm brings the pointer 19 somewhere within the "Refill" designation. If pointer 19 should remain within the "Refill" designation for an unusually long period of time, it indicates to the operator that the gasoline from the tank is not feeding into the fitting at the proper rate. If pointer 19 should not return to "Refill" periodically, an indication is afforded the operator that no fuel is being taken over and that the trouble lies in the feed line 22 or vacuum tank 23. This performance of the pointer 19 will indicate to the observer the functioning of the fuel feeding system. If the pointer moves back beyond normal refill position, an indication is afforded that the atmospheric vent of the tank is stopped up.

The significance of the designation "Overflow" is that, in the case of tanks which have a long fill spout extending considerably above the level of the top of the tank when gasoline having filled the tank enters said filling spout, the pointer 19 will enter the designation "Overflow", enabling the operator to stop the entrance of gasoline and thereby prevent spilling and waste.

A pipe or tube 22 leading to a vacuum fuel feeding device 23 is arranged for the flow of liquid fuel from the lower portion of the pressure chamber through a passage 24 opening near the bottom of the pressure chamber, and normally under the level of the liquid therein. As shown the passage 24 includes an opening formed in an extension 25 of the upper portion of the fitting.

The installation and operation of the instrument is as follows:

The fitting, which comprises the upper portion 3 and the lower portion 4, is applied to the liquid tank by screwing the stud 5 into the threaded hole in the flange 2. The tube 9, sleeve 7, plug 10, spring 11, and plug 12, which are all secured together, are passed up through the hollow stud 5 after which the plug 12 is screwed into place. The tube 15—16 is connected to the indicating device and to the outlet 26 of the fitting. The tube 22 from the vacuum tank is connected with the passage 24 of the fitting. Gasoline is then poured into the tank 1. As the gasoline rises in the tank 1 it passes through the holes 8 in the sleeve 7 and downwardly through the holes 14 in the plug 10 into the pressure chamber. The gasoline rises in the pressure chamber to about the level shown where, due to the confined air in the upper portion of said chamber, further rising of the level of the liquid is prevented. The liquid passes through the holes 13 into the tube 9 seeking the same level as that of the gasoline in the tank 1. The confined air in the upper portion of the pressure chamber and in the tube 15—16 exerts pressure on the indicating device, which indicates the height of the gasoline in the tank. When the vacuum feeding system operates it draws liquid from the pressure chamber through the relatively large passage 24 and thence through the tube 22 to the vacuum tank 23.

During this process of withdrawal from the lower portion of the pressure chamber the gasoline from the tank 1 enters the pressure chamber through the holes 14. The holes 14 are so constructed with respect to the passage 24 that the gasoline from the tank enters the pressure chamber at a slower rate than it is withdrawn through the outlet. This causes the level of the gasoline in the pressure chamber to lower rapidly, with the result that all of the gasoline falls out of the tube 9. When all of the gasoline is withdrawn from the tube 9 the pressure chamber is in communication with atmosphere in the upper portion of the tank. This communication with the atmosphere at the top of the tank prevents and overcomes the objectionable effect of dissolution or absorption of the air by the gasoline which would otherwise occur, and also compensates for any change in head due to expansion or contraction of the air or gasoline. When the vacuum tank 23 ceases to operate the liquid continues to flow from the tank 1 through the holes 14 until it has again risen to the desired level where it is stopped by the resistance of the air in the upper portion of the fitting, and the indicating device again indicates the height of the gasoline in the tank.

The intermittent exposure of the fitting chamber to atmosphere is an important feature of the invention. Heretofore in gages of this character the level of the liquid in the compensating chamber gradually changes, due to the dissolving of the air by the gasoline. To remedy this it has been necessary to drain the pressure chamber quite frequently to expose it to air. By the present invention air is admitted to the pressure chamber automatically and intermittently, and as an incident to the operation of the vacuum feeding device. Obviously, this is more desirable than the special draining operations mentioned.

While I have shown the invention applied to use in connection with the vacuum feeding device of an automobile, I do not restrict myself to that or to any other specific use of the invention. Obviously, the invention is capable of a wide range of uses and various provisions may be made for admitting atmosphere into the pressure chamber without resort to such inconvenient operations as manually draining the chamber. My invention comprises broadly automatic means for periodically placing the chamber in communication with the atmosphere, as an incident to the operation or use of the invention.

The approved instrument herein shown and described possesses numerous advantages over the usual equipment, such for instance, as the float gage in connection with the fuel tank. The fuel tank of an automobile is usually located at the rear, and the float gage in connection with the tank necessarily becomes obscured by accumulations of dust; and, moreover, being located at the rear of the automobile, it is not in a position in which it is convenient to observe. Indeed, it is impossible to observe the float gage when the automobile is running, or during the night, unless a light is provided. The present invention, in which the indicating device is located preferably upon the instrument board in a position in which it may be conveniently observed from the driver's seat, affords a constant indication of the amount of liquid contained in the fuel tank. The invention also dispenses with the necessity of having numerous parts such, for instance, as the mountings for the float gage, the sump at the bottom of the tank, and the connections and mountings therefor for the vacuum feeding system to the fuel tank and other parts needed in connection with the present equipment.

It will, therefore, be seen that this invention accomplishes its objects. In accordance with this invention, the volume of confined air sealed by the liquid and acting on the responsive device, is automatically exposed to the atmosphere at intervals.

As the liquid is drained from the pressure chamber by the fuel pump, the liquid level will drop sufficiently to permit a considerable amount of atmospheric air to enter the chamber above the liquid. Now the impregnation of the air by the vapor causes a layer of such vapor to lie immediately above the liquid, and this layer drops with the liquid level as the chamber is drained. When atmospheric air enters the chamber, it will not only tend to overlie the vapor layer or stratum, but this atmospheric air being lighter than the vapor will rise to the top of the chamber, and even enter the lead and the instrument, so as to not only diffuse therein, but in a way displacing the heavier vapor. When, therefore, the withdrawal of the fuel from the pressure chamber ceases the vapor will collect in a layer or stratum above the liquid and below the atmospheric tube opening. When the level of the liquid in the pressure chamber again rises upon refilling of the same from the tank, air will be expelled from the chamber until the liquid level rises above and seals the atmospheric tube. Upon such rise, however, the air expelled will be that immediately above the liquid level, and which is the stratum which is laden or impregnated with the vapor.

It will, therefore, be seen that in accordance with this invention, not only is the confined volume of air exposed to the atmosphere, but the laden air in contact with the liquid is expelled and replaced by fresh air. Accordingly atmospheric conditions are automatically established in the air volume at intervals. The operations, in fact, resemble those of breathing, since periodically fresh air is inhaled while laden air is exhaled. During such operations, not only is the air in the pressure chamber periodically regenerated, but this also extends to the lead and even the responsive device; for the fresh air will not only diffuse therein, but the alternate reduction and reestablishment of the liquid head in the chamber, will cause a corresponding reduction and reestablishment of the air pressure in the chamber, as well as in the lead and the responsive device; accordingly there will be set up an alternating air flow from and to the responsive device and along the lead; this will clear the lead as well as the responsive device of any laden air.

The reestablishment of atmospheric conditions in the pressure chamber is entirely automatic; accordingly the compensation is independent of the will or memory of the operator or driver. Moreover the facts of compensation, exposure and expulsion are periodically indicated by the responsive device; accordingly these facts are always under observation.

It will be noted that the confined volume of air which acts on the responsive device, is sealed by a portion of the liquid in communication with the body of the liquid and with the column of the liquid in the atmospheric tube, in which latter the liquid rises to and stands at a height corresponding to that of the liquid in the tank. Accordingly the air volume is under a pressure due to the head of a separate column of the liquid in communication with the liquid body and open to the atmosphere, or more especially open to the space above the liquid in the tank, which is open to the atmosphere. This is an important feature of this invention and enables the responsive device to indicate conditions other than the depth of the liquid in the tank.

As the presure chamber drains, the liquid will drop in the atmospheric tube at the same rate that the pointer of the responsive device moves back to the empty position, while as the chamber again fills and a pressure is again reestablished therein corresponding to the head of the liquid, the liquid again rises at the same rate as the pointer moves to indicating position. The responsive device, therefore, indicates variations of the air pressure in the chamber. The presence of this atmospheric tube, therefore, causes the pointer to move with regularity and at a certain rate if conditions are really normal, while abnormal conditions will also be indicated by the absence of such regularity.

If, for instance, the pressure chamber is not drained, due to a leak or a stop in the fuel line or improper operation of the vacuum pump, then the column in the atmospheric tube will remain stationary, so that the pointer will not move back at all. If the passage between the tank and the chamber is stopped up, the liquid will not rise in the atmospheric tube so that the pointer will remain at refill position; if the passage is only partially closed, the liquid rise in the tube will be sluggish thereby causing the pointer to return correspondingly. If the atmospheric vent in the tank is closed, the pressure in the tank, which is below atmospheric pressure, is then established in the pressure chamber through the atmospheric tube, so that the pointer will move back beyond normal refill position. If the tank overflows, the liquid rise in the atmospheric tube will be above normal, which will be indicated by the pointer.

It will, therefore, be seen that in accordance with this invention, not only is the level of the liquid indicated, but the flow therefrom is also indicated, and this indication is such that faults may be readily traced.

From the foregoing it will be seen that my invention accomplishes all of its intended objects and purposes. The invention is highly efficient in operation, includes comparatively few parts, is readily installed and does not easily become disarranged. I do not restrict myself to unessential features or limitations, but what I claim and desire to secure by Letters Patent, is:—

1. The method of indicating the head of a body of liquid, consisting in causing a volume of air, confined beneath the surface of the liquid and trapped and sealed by the liquid against communication with the air above the liquid, to act on a pressure responsive device for indicating head, and periodically breaking the liquid seal to bring the confined air into commuication with the air above the liquid.

2. The method of indicating the head of a body of liquid, a minor portion of which has restricted communication with the remainder, said method consisting in causing a confined volume of air, trapped and sealed by said minor portion against communication with the air above the liquid, to act on a pressure responsive device for indicating head, and periodically withdrawing a part of said portion more rapidly than it can be replaced and sufficient in amount to break the liquid seal and thus bring the confined air into communication with the air above the liquid.

3. The method of indicating the head of a body of liquid in a tank, consisting in causing a volume of air confined in a chamber beneath the surface of the liquid and trapped by the liquid to act on a pressure responsive device for indicating head, and periodically establishing communication between the chamber and the same space in the tank above the liquid and inhaling and exhaling air into and from said chamber from said space.

4. The method of indicating the head of a body of liquid in a tank, consisting in trapping a volume of air, confined beneath the surface of the liquid and acting on a pressure responsive device for indicating head, by a portion of the liquid in restricted communication with the main body of the liquid and also in communication with a slender separate column of the liquid, and periodically withdrawing liquid from said portion more rapidly than it can be replaced from the main body of the liquid so as to cause depression of said separate column to the point of admitting air to the aforesaid body of air.

5. An apparatus for indicating the head of a body of liquid in a tank, comprising the combination with a pressure chamber below the level of the liquid in the tank and having connection with the liquid in the tank, and provided with a passage open at its lower end below the normal level of the liquid in the chamber thereby forming a liquid seal and communicating at its upper end with the space above the liquid in the tank, air being confined in the chamber by said liquid seal, of a liquid withdrawing means, adapted to periodically withdraw sufficient liquid directly from said chamber to lower the liquid level therein so as to open said passage for intercommunication between the air in said chamber and in said tank.

6. An apparatus for indicating the head of a body of liquid in a tank, comprising the combination with the tank of a pressure chamber below the level of the liquid in the tank and having connection with the liquid in the tank whereby liquid may enter said chamber, and provided with means forming a liquid seal, the air being trapped in the chamber by said liquid seal, a responsive device connected with said chamber and responsive to the variations of air pressure therein, said seal-forming means comprising a passage between the chamber and the air above the liquid in the tank, and a fuel feeding system arranged to withdraw liquid from said chamber in order to lower the liquid level therein so as to open said passage for intercommunication between the air in said chamber and in said tank, the withdrawal and replacing of said liquid causing the inhaling and exhaling of air into and from said chamber through said passage.

7. An apparatus for indicating the head of a body of liquid in a tank, comprising the combination with the tank of a pressure chamber below the level of the liquid in the tank and having connection with the liquid in the tank whereby liquid may enter said chamber, and provided with means forming a liquid seal, the air being trapped in the chamber by said liquid seal, a responsive device connected with said chamber and responsive to the variations of air pressure therein, said seal-forming means comprising a passage between the chamber and the air above the liquid in the tank, a fuel feeding system arranged to withdraw liquid from said chamber, means forming a restricted communication between said chamber and the liquid in said tank, and means forming a comparatively unrestricted communication between said chamber and said fuel feeding system, said communications and said fuel feeding system cooperating to alternately raise and lower the liquid level in said chamber so as to alternately form and break the liquid seal and thereby cause inhaling and exhaling of air into and from said chamber through said passage.

LEWIS A. MAPEL.